US010159070B2

(12) United States Patent
Awoniyi-Oteri et al.

(10) Patent No.: US 10,159,070 B2
(45) Date of Patent: Dec. 18, 2018

(54) INTEROPERATION TECHNIQUES FOR WWAN AND WLAN RECEIVE CHAINS

(71) Applicant: QUALCOMM Incorporated, San Diego, CA (US)

(72) Inventors: Olufunmilola Awoniyi-Oteri, San Diego, CA (US); Samir Salib Soliman, Poway, CA (US); Bongyong Song, San Diego, CA (US); Michael Kohlmann, San Francisco, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 336 days.

(21) Appl. No.: 14/560,635

(22) Filed: Dec. 4, 2014

(65) Prior Publication Data

US 2016/0165576 A1 Jun. 9, 2016

(51) Int. Cl.
H04W 72/04 (2009.01)
H04B 1/00 (2006.01)
H04W 48/16 (2009.01)
H04B 1/18 (2006.01)
H04W 84/04 (2009.01)
H04W 84/12 (2009.01)
H04W 88/06 (2009.01)
H04B 7/08 (2006.01)

(52) U.S. Cl.
CPC ........ *H04W 72/042* (2013.01); *H04B 1/0064* (2013.01); *H04B 1/0067* (2013.01); *H04B 1/18* (2013.01); *H04W 48/16* (2013.01); *H04B 7/08* (2013.01); *H04W 84/04* (2013.01); *H04W 84/12* (2013.01); *H04W 88/06* (2013.01)

(58) Field of Classification Search
CPC ..................................................... H04W 72/04
See application file for complete search history.

(56) References Cited

U.S. PATENT DOCUMENTS

| 7,133,646 B1 | 11/2006 | Miao |
| 8,073,500 B2 | 12/2011 | Chang et al. |
| 8,228,876 B2 | 7/2012 | Lim |
| 8,565,204 B2 | 10/2013 | Kalhan |
| 2005/0266808 A1 | 12/2005 | Reunamaki et al. |
| 2007/0242784 A1 | 10/2007 | Sampson et al. |
| 2013/0130687 A1* | 5/2013 | Kumar Reddy ...... H04W 36/08 455/436 |
| 2014/0064068 A1 | 3/2014 | Horn et al. |
| 2014/0146691 A1 | 5/2014 | Soliman |

(Continued)

OTHER PUBLICATIONS

ISA/EPO, International Search Report and Written Opinion of the International Searching Authority, Int'l. App. No. PCT/US2015/057346, dated Jan. 27, 2016, European Patent Office, Rijswijk, NL, 12 pgs.

*Primary Examiner* — Sulaiman Nooristany
(74) *Attorney, Agent, or Firm* — Holland & Hart LLP/Qualcomm

(57) ABSTRACT

A user equipment (UE) may receive a wireless wide area network (WWAN) signal on a first antenna. The UE may process the WWAN signal with a portion of a WWAN receive chain of a WWAN module of the UE. The WWAN signal may be routed from the WWAN receive chain to a wireless local area network (WLAN) receive chain of a WLAN module of the UE. The UE may then process the WWAN signal with a portion of the WLAN receive chain.

18 Claims, 10 Drawing Sheets

(56) References Cited

U.S. PATENT DOCUMENTS

| | | | | |
|---|---|---|---|---|
| 2014/0146732 A1* | 5/2014 | Olufunmilola | ....... | H04W 24/10 370/311 |
| 2015/0036656 A1* | 2/2015 | McCarthy | ............ | H04B 7/0871 370/331 |

* cited by examiner

INTEROPERATION TECHNIQUES FOR WWAN AND WLAN RECEIVE CHAINS

BACKGROUND

1. Field of the Disclosure

The present disclosure, for example, relates to wireless communications systems, and more particularly to cooperative use of wireless wide area network (WWAN) and wireless local area network (WLAN) components.

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations or access points, each simultaneously supporting communication for multiple communication devices, otherwise known as user equipments (UEs). A base station or access point may communicate with UEs on downlink channels (e.g., for transmissions from a base station to a UE) and uplink channels (e.g., for transmissions from a UE to a base station). Communication between a UE and a base station may use a wireless wide area network (WWAN), while communication between a UE and an access point may use a wireless local area network (WLAN). Wi-Fi is an example of a common WLAN technology supported by a UE. UEs typically include different WWAN and WLAN receive (Rx) and transmit (Tx) chains. For example, a UE may have one or more Rx and Tx chains used for WWAN communications, and may also have one or more separate Rx and Tx chains used for WLAN communications.

Sometimes the WWAN Rx/Tx chains are used while the WLAN Rx/Tx chains are not being used or have capacity for additional use. For example, a UE may be in a connected state using a WWAN (e.g., an LTE network), thus using one or more WWAN Rx/Tx chains. Typically, this means that the one or more WWAN Rx/Tx chains are tuned to certain frequencies or frequency bands. However, while the UE uses the WWAN, the UE may also have need to search for cells or make measurements on frequencies that are different from those that the WWAN Rx/Tx chains are tuned, for example as in the case of inter-Radio Access Technology (inter-RAT) search.

SUMMARY

A UE may include multiple antennas and multiple modules that may generally be used for different radio access technologies. For example, communication between a UE and a base station may use a wireless wide area network (WWAN), while communication between a UE and an access point may use a wireless local area network (WLAN). UEs typically include different WWAN and WLAN receive (Rx) and transmit (Tx) chains. While the UE uses the WWAN, the UE may also search for cells or make measurements using portions of the WLAN Rx/Tx chains. Two options are described for sharing portions of the WLAN Rx/Tx chains for WWAN operations such as inter-frequency measurements or search. A first option may apply when one WWAN carrier is active and there is a need for conducting a WWAN search for a second frequency. The second option may apply when two carriers are active and the UE has need to search for a third carrier which is in the same band group as one of the active carriers.

In a first set of illustrative examples, a method for wireless communication is described. In one example, the method may include receiving a wireless wide area network (WWAN) signal on a first antenna of a user equipment (UE); processing the WWAN signal with a portion of a WWAN receive chain of a WWAN module of the UE; routing the WWAN signal from the WWAN receive chain to a wireless local area network (WLAN) receive chain of a WLAN module of the UE; and processing the WWAN signal with a portion of the WLAN receive chain.

In some examples of the method, routing the WWAN signal from the WWAN receive chain to the WLAN receive chain may include configuring a switch in the WWAN receive chain. In some examples of the method, receiving the WWAN signal on the first antenna may include receiving the WWAN signal on a diversity WWAN antenna associated with the WWAN module. In some examples of the method, receiving the WWAN signal on the first antenna may include receiving the WWAN signal on a WLAN antenna associated with the WLAN module. In some examples, the method may include routing the WWAN signal from the WLAN module to the WWAN receive chain of the WWAN module. In some examples of the method, routing the WWAN signal from the WLAN module to the WWAN receive chain may include configuring a switch in the WLAN receive chain. In some examples of the method, the portion of the WWAN receive chain comprises a bandpass filter of the WWAN module. In some examples of the method, routing the WWAN signal from the WWAN receive chain to the WLAN receive chain may include routing the WWAN signal after the bandpass filter of the WWAN module. In some examples of the method, the portion of the WLAN receive chain comprises an amplifier of the WLAN module. In some examples of the method, the WWAN signal comprises a WWAN search measurement. In some examples, the method may include receiving a second WWAN signal on a second antenna of the UE, where the second WWAN signal includes an active downlink signal.

In a second set of illustrative examples, an apparatus for wireless communication is described. In one example, the apparatus may include means for receiving a wireless wide area network (WWAN) signal on a first antenna of a user equipment (UE); means for processing the WWAN signal with a portion of a WWAN receive chain of a WWAN module of the UE; means for routing the WWAN signal from the WWAN receive chain to a wireless local area network (WLAN) receive chain of a WLAN module of the UE; and means for processing the WWAN signal with a portion of the WLAN receive chain. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to receive a wireless wide area network (WWAN) signal on a first antenna of a user equipment (UE); process the WWAN signal with a portion of a WWAN receive chain of a WWAN module of the UE; route the WWAN signal from the WWAN receive chain to a wireless local area network (WLAN) receive chain of a WLAN module of the UE; and process the WWAN signal with a portion of the WLAN receive chain. In some examples of the apparatus, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication is described. In one example, the code may be executable by a processor to receive a wireless wide area network (WWAN) signal on a first antenna of a user equipment (UE); process the WWAN signal with a portion of a WWAN receive chain of a WWAN module of the UE; route the WWAN signal from the WWAN receive chain to a wireless local area network (WLAN) receive chain of a WLAN module of the UE; and process the WWAN signal with a portion of the WLAN receive chain. In some examples of the non-transitory computer-readable medium, the code may also be executable by the processor to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
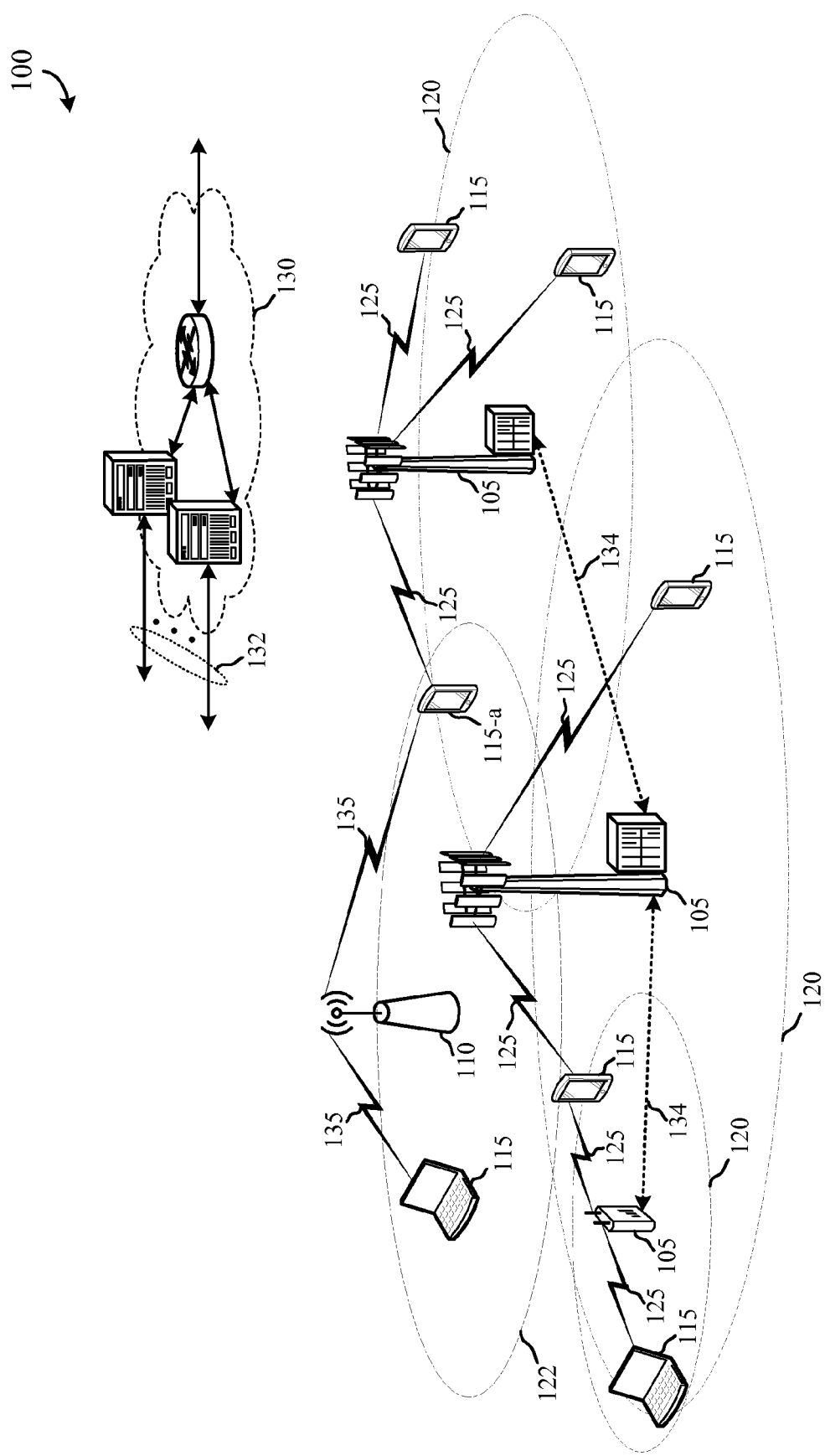
FIG. 1 shows a system diagram of a wireless communications system, in accordance with various aspects of the present disclosure.

Many UEs include multiple antennas and Rx/Tx modules so as to facilitate communications on different RATs. In one example, a UE may include one or more WWAN antennas and may also include at least one WLAN antenna. The antennas may each be associated with corresponding modules that include receive (Rx) and transmit (Tx) chains. While the UE uses the WWAN Rx/Tx chains, the UE may also search for cells or make measurements using portions of the WLAN Rx/Tx chains. Two options are described for sharing portions of the WLAN Rx/Tx chains for WWAN operations such as inter-frequency measurements or search.

In the first option, the search for an additional WWAN frequency may use a diversity antenna associated with the WWAN module. Measurements received via the diversity WWAN antenna may be processed through the front end radio frequency (RF) components of the WWAN Rx chain of the WWAN module, up unto and including a bandpass filter in the WWAN Rx chain. Switches may be added to the WWAN Rx chain to route the received measurements from the WWAN Rx chain to the WLAN Rx chain where the signal is amplified. In each case, the WWAN Rx and WLAN Rx chains may be part of WWAN and WLAN modules, respectively. In this option, no changes may be required to the WWAN Rx chain other than the insertion of switches, and no RF components may need be replicated—existing components of the WWAN and WLAN modules may be used. However, in this option, the WWAN Rx chain may become unavailable for additional WWAN reception on the same band group. Alternatively, in the case that the WWAN Rx chain is shared for the reception of signals in the same band group, there may be performance degradation to both receptions.

In the second option, the WLAN antenna may be used for receiving the WWAN measurements signal. The WWAN measurements may then be routed to the frontend RF components of the WWAN Rx chain of the WWAN module, up unto and including a bandpass filter in the WWAN Rx chain. The WWAN measurements may then be routed back to the WLAN Rx chain of the WLAN module. In this option, switches are added or modified in the RF sections of both the WWAN and the WLAN Rx chains, which may be components of WWAN and WLAN modules, respectively.

In both options, switches are added to at least one of the WWAN and WLAN Rx chains. The described sharing options are appropriate for instances where WWAN inter-RAT or inter-frequency measurements are being made with or without carrier aggregation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a system diagram illustrates an example of a wireless communications system 100. The wireless communications system 100 may include base station(s) 105, access point(s) (AP) 110, and mobile devices such as UEs 115. The AP 110 may provide wireless communications via a WLAN radio access network (RAN) such as, e.g., a network implementing at least one of the IEEE 802.11 family of standards. The AP 110 may provide, for example, Wi-Fi or other WLAN communications access to a UE 115. Each AP 110 has a geographic coverage area 122 such that UEs 115 within that area can typically communicate with the AP 110. UEs 115 may be multi-access mobile devices that communicate with the AP 110 and a base station 105 via different radio access networks. The UE 115, such as mobile stations, personal digital assistants (PDAs), other handheld devices, netbooks, notebook computers, tablet computers, laptops, display devices (e.g., TVs, computer monitors, etc.), printers, etc., may be stationary or mobile and traverse the geographic coverage areas 122 and/or 120, the geographic coverage area of a base station 105. While only one AP 110 is illustrated, the wireless communications system 100 may include multiple APs 110. Some or all of the UEs 115 may associate and communicate with an AP 110 via a communication link 135 and/or with a base station 105 via a communication link 125.

The wireless communications system 100 may also include a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

A UE 115 can be covered by more than one AP 110 and/or base station 105 and can therefore associate with multiple APs 110 or base stations 105 at different times. For example, a single AP 110 and an associated set of UEs 115 may be referred to as a basic service set (BSS). An extended service set (ESS) is a set of connected BSSs. A distribution system (DS) (not shown) is used to connect APs 110 in an extended service set. A geographic coverage area 122 for an access point 110 may be divided into sectors making up only a portion of the geographic coverage area (not shown). The wireless communications system 100 may include APs 110 of different types (e.g., metropolitan area, home network, etc.), with varying sizes of coverage areas and overlapping coverage areas for different technologies. Although not shown, other wireless devices can communicate with the AP 110.

The base stations 105 may wirelessly communicate with the UEs 115 via base station antennas. Each of the base station 105 sites may provide communication coverage for a respective geographic coverage area 120. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 120 for a base station 105 may be divided into sectors making up only a portion of the coverage area (not shown). The wireless communications system 100 may include base stations 105 of different types (e.g., macro and/or small cell base stations). There may be overlapping geographic coverage areas 120/122 for different technologies.

In some examples, the wireless communications system 100 includes portions of an LTE/LTE-A network. In LTE/LTE-A networks, the term evolved Node B (eNB) may be generally used to describe the base stations 105, while the term UE may be generally used to describe the mobile devices 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, APs, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Similarly, communication links 135, also shown in wireless communications system 100, may include UL transmissions from a UE 115 to an access point 110, and/or DL transmissions from an access point 110 to a UE 115.

In some embodiments of the system 100, base stations 105, APs 110, and/or UEs 115 may include multiple antennas for employing antenna diversity schemes to improve communication quality and reliability between base stations 105, APs 110, and UEs 115. Additionally or alternatively, base stations 105, APs 110, and/or UEs 115 may employ multiple-input, multiple-output (MIMO) techniques that may take advantage of multi-path environments to transmit multiple spatial layers carrying the same or different coded data. The APs 110 may be integrated into base stations 105, allowing the base stations 105 to also perform the functions of an AP 110.

System 100 includes a UE 115-*a* which is in communication with both a base station 105 and an access point 110. As an example, UE 115-*a* may communicate with the access point 110 using Wi-Fi or other WLAN communications, while the UE 115-*a* may communicate with the base stations 105 using LTE or other WWAN communications. While the UE 115-*a* is communicating with one base station 105, the UE 115-*a* may receive search measurements from neighboring base stations 105. The search measurements may inform the UE 115-*a* of the frequencies and RATs used by the neighboring base stations 105. The UE 115-*a* may receive and process the search measurements at or near the same time as other WWAN communications by utilizing a portion of a WLAN receive chain in the UE 115-*a*.

Figure 2:
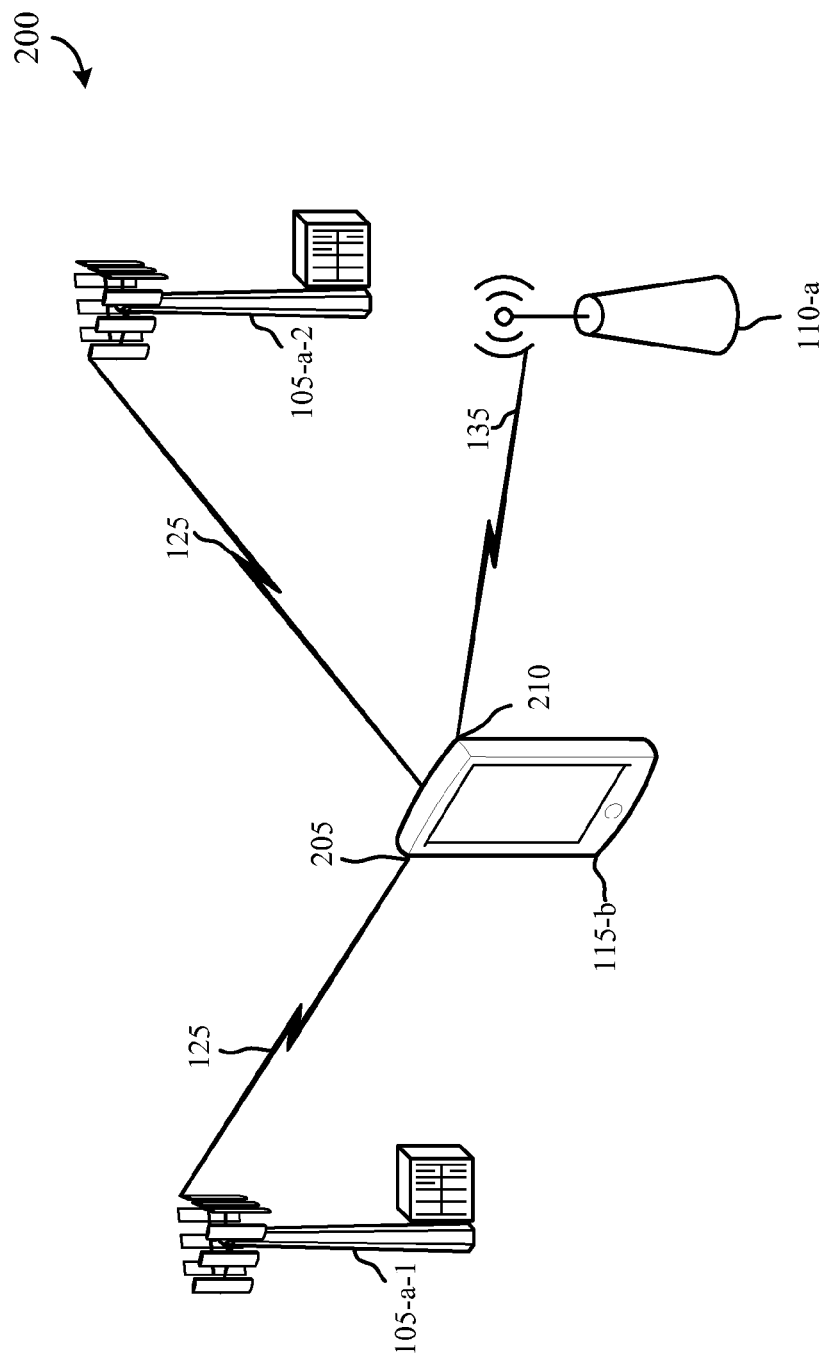
FIG. 2 illustrates a system diagram that shows an example of a wireless communications system, in accordance with various aspects of the present disclosure.

FIG. 2 illustrates a system diagram that shows an example of a wireless communications system 200. The wireless communications system 200 may include base stations 105-*a*-1, 105-*a*-2, access point 110-*a* and UE 115-*b*. The UE 115-*b* may be an example of UE 115-*a* in system 100 of FIG. 1 and may be capable of both WWAN and WLAN communications. The base stations 105-*a*-1, 105-*a*-2 may be examples of base stations 105 included in system 100 of FIG. 1, and the access point 110-*a* may be an example of the access point 110 in system 100 of FIG. 1.

In system 200, the UE 115-*b* may include at least two different antennas, WWAN antenna 205 and WLAN antenna 210. For example, WWAN antenna 205 may be a WWAN antenna associated with a WWAN module. Using the WWAN antenna 205, the UE 115-*b* may engage in WWAN communications with base station 105-*a*-1. The WWAN antenna 205 and associated WWAN module may include both Rx and Tx chains used during WWAN communications. The WWAN antenna 205 may also include one or more diversity WWAN antennas to facilitate multiple WWAN communications with base station 105-*a*-1 and/or base station 105-*a*-2. In some examples, one or more of the diversity WWAN antennas 205 may receive WWAN search measurements from a neighboring cell which may be associated with the same base station or a neighboring base station such as base station 105-*a*-2. The neighboring cell maybe in the same frequency, different frequency or a different RAT as the WWAN signal being received on the WWAN antenna. These search measurements may comprise control information from the cells such as the synchronization channel, pilot channel and broadcast channel. The UE 115-*b* may route the received WWAN search measurements to a WLAN module for processing by a portion of the WLAN Rx chain. By using a portion of the WLAN Rx chain, the UE 115-*b* may receive and process the WWAN search measurements at or near the same time as receiving and processing other WWAN communication from the WWAN antenna 205.

In system 200, the UE 115-*b* may use the WLAN antenna 210 to communicate with the access point 110-*a* (via communication link 135). The communications with the access point 110-*a* may be Wi-Fi or other WLAN communications. In some examples, the WLAN antenna 210 may also receive WWAN search measurements from a neighboring base station, such as base station 105-*a*-2. The UE 115-*b* may route the received WWAN search measurements to the WWAN module for processing by RF front end components of the WWAN Rx chain. The UE 115-*b* may then route the WWAN search measurements back to the WLAN module for further processing by a portion of the WLAN Rx chain. By receiving the WWAN search measurements on the WLAN antenna, and by using a portion of the WLAN Rx chain, the UE 115-*b* may receive and process the WWAN search measurements at or near the same time as receiving and processing other WWAN communication from the WWAN antenna 205.

Figure 3:
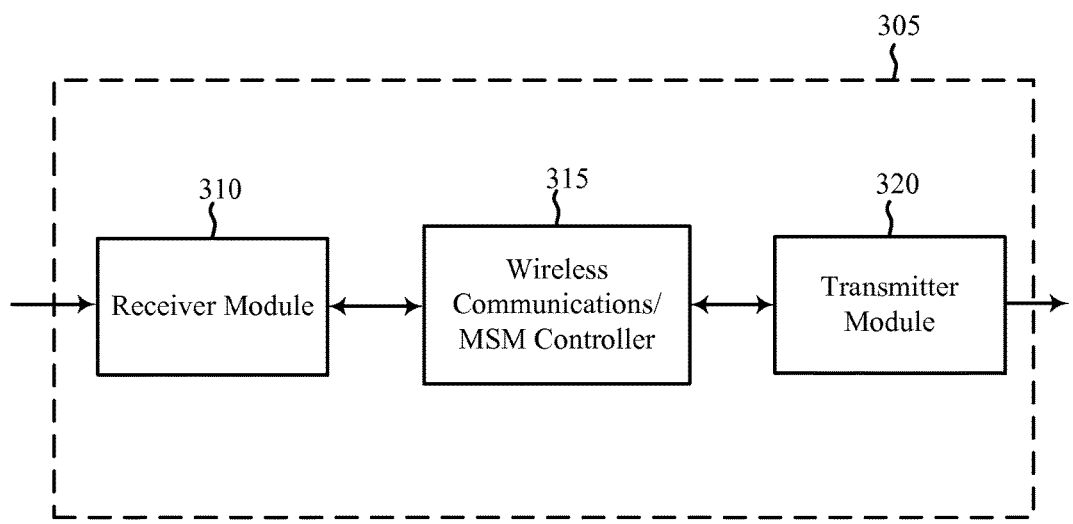
FIG. 3 shows a block diagram of a device for use in wireless communication, in accordance with various aspects of the present disclosure

FIG. 3 shows a block diagram 300 of a device 305 for use in wireless communication, in accordance with various aspects of the present disclosure. The device 305 may be an example of one or more aspects of a UE 115 described with reference to FIGS. 1 and/or 2. The device 305 may include a receiver module 310, a wireless communications/mobile station modem (MSM) controller 315, and/or a transmitter module 320. The device 305 may also be or include a processor (not shown). Each of these modules may be in communication with each other.

The components of the device 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 310 may receive information such as packets, user data, and/or control information associated with various information channels (e.g., control channels, data channels, etc.). The receiver module 310 may be configured to receive both WLAN communications (such as Wi-Fi communications) as well as WWAN communications (such as LTE or GSM communications). The receiver module 310 may use components for receiving WLAN communications to process WWAN search measurements. The receiver module 310 may then pass the WWAN search measurements processed by the WLAN components to the wireless communications/MSM controller 315.

The wireless communications/MSM controller 315 may include some or all of the components of the MSM, and/or control the MSM and other wireless communications. The wireless communications/MSM controller 315 may configure the receiver module 310 to process WWAN search measurements with components for receiving WLAN communications. The wireless communications/MSM controller 315 may also configure the receiver module 310 and transmitter module 320 based on the received WWAN search measurements. For example, the receiver module 310 and transmitter module 320 may be configured based on the frequency and RAT information of a neighboring cell. The wireless communications/MSM controller 315 may also perform digital processing of the WWAN communications and/or the WLAN communications. Additional details regarding the wireless communications/MSM controller 315 are described below with relation to FIG. 4, for example.

The transmitter module 320 may transmit information such as packets, user data, and/or control information associated with various information channels (e.g., control channels, data channels, etc.). The transmitter module 320 may be configured to transmit both WLAN communications (such as Wi-Fi communications) as well as WWAN communications (such as LTE or GSM communications).

Figure 4:
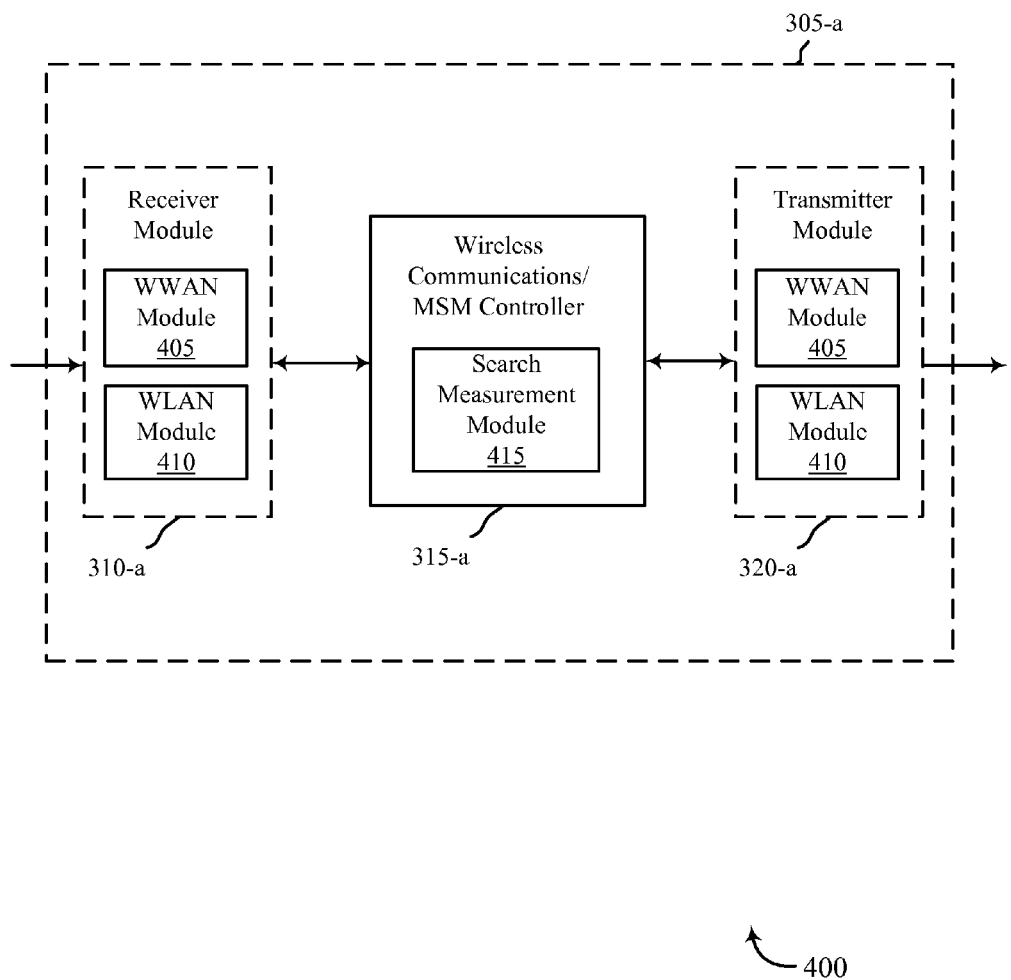
FIG. 4 shows a block diagram of another device for use in wireless communication, in accordance with various aspects of the present disclosure.

FIG. 4 shows a block diagram 400 of a device 305-a for use in wireless communication, in accordance with various examples. The device 305-a may be an example of one or more aspects of a UE 115 described with reference to FIGS. 1 and/or 2. It may also be an example of a device 305 described with reference to FIG. 3. The device 305-a may include a receiver module 310-a, a wireless communications/MSM controller 315-a, and/or a transmitter module 320-a, which may be examples of the corresponding modules of device 305. The device 305-a may also include a processor (not shown). Each of these components may be in communication with each other. In some examples, the transmitter module 320-a may be collocated with the receiver module 310-a.

The receiver module 310-a and the transmitter module 320-a may both include a WWAN module 405 and a WLAN module 410. In the example illustrated in FIG. 4, the receiver module 310-a and the transmitter module 320-a each share the WWAN module 405 and the WLAN module 410. Thus, in some embodiments, the receiver module 310-a and the transmitter module 320-a may be collocated. In other embodiments, the receiver module 310-a and the transmitter module 320-a may each include separate WWAN and WLAN modules. The WWAN module 405 may be used for processing received WWAN communications. The WWAN module 405 may include some or all of the components of Tx and Rx chains of a WWAN modem. The WWAN module 405 may also route a received WWAN search measurement to the WLAN module 410 for processing. The WWAN module 405 may be used for transmitting both WLAN and WWAN communications. The WLAN module 410 may include some or all of the components of Tx and Rx chains of a WLAN modem. The WLAN module 410 may process both WLAN communications and the WWAN search measurement. The WWAN search measurement may be processed by a portion of the components in the WLAN module 410, and then passed to the wireless communications/MSM controller 315-a.

The wireless communications/MSM controller 315-a may include some or all of the components of the WWAN module 405 and/or WLAN module 410, and/or control the operation of the WWAN module 405 and WLAN module 410. The wireless communications/MSM controller 315-a may control the routing of the WWAN search measurement between the WWAN module 405 and the WLAN module 410. The wireless communications/MSM controller 315-a may include a search measurement module 415. The search measurement module 415 may instruct the wireless communications/MSM controller 315-a to search for additional WWAN cells or RATs. The search measurement module 415 may also use the results of the WWAN search measurements to provide the receiver module 310-a and transmitter module 320-a with information on the frequencies and/or RATs used by neighboring cells.

Figure 5:
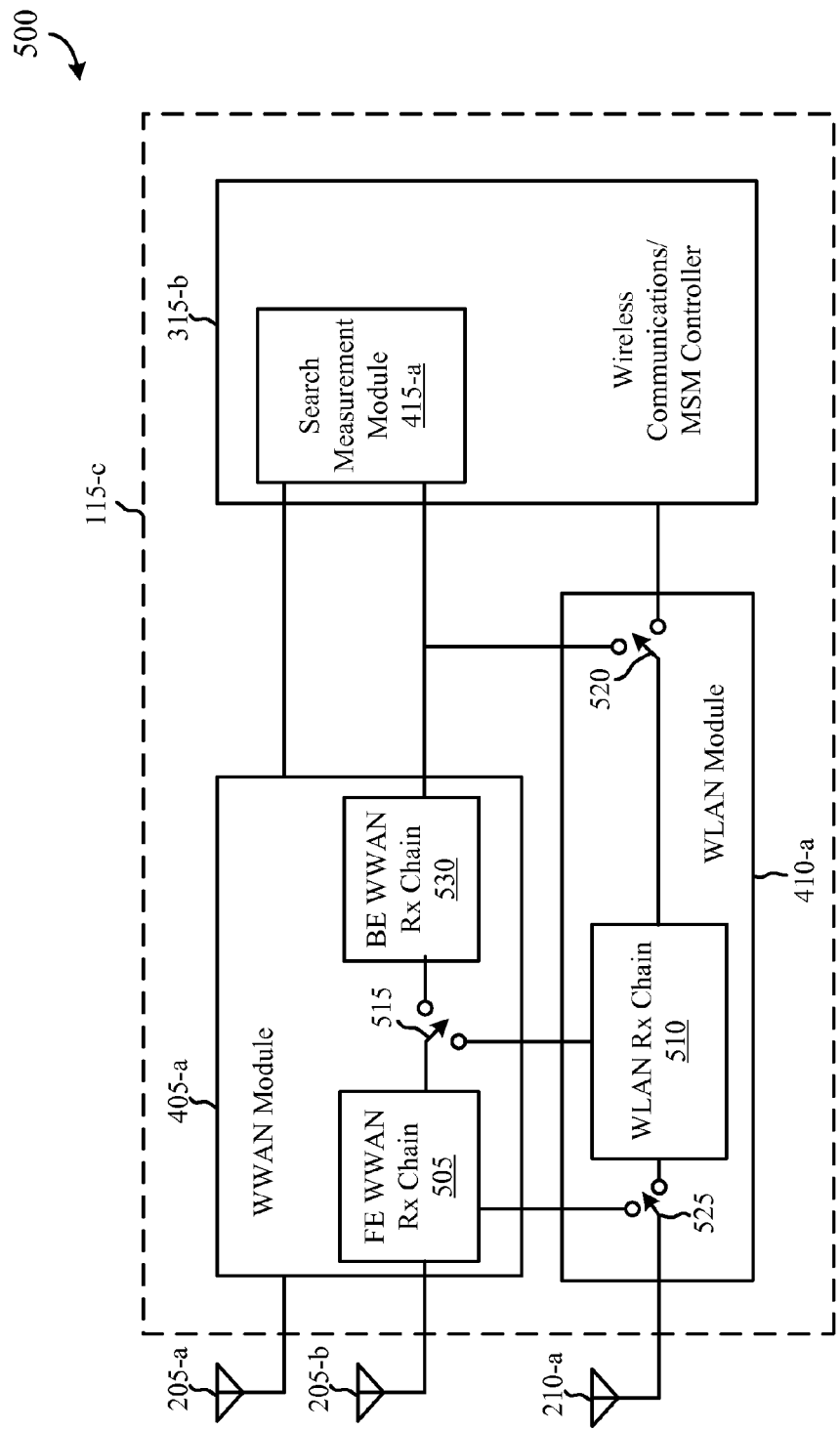
FIG. 5 shows a system for use in wireless communication, in accordance with various aspects of the present disclosure.

FIG. 5 shows a system 500 for use in wireless communication, in accordance with various examples. System 500 may include a UE 115-c, which may be an example of the UEs 115 of FIGS. 1 and/or 2. UE 115-c may also be an example of one or more aspects of devices 305 of FIGS. 3 and/or 4.

The UE 115-c may include a WWAN module 405-a, a WLAN module 410-a, and a wireless communications/MSM controller 315-b. The WWAN module 405-a may be associated with a primary WWAN antenna 205-a and a diversity WWAN antenna 205-b. The WWAN module may also include a WWAN Rx chain divided into a front end (FE) portion 505 and a back end (BE) portion 530. The WLAN module may be associated with a WLAN antenna 210-a and may include a WLAN Rx chain 510.

In some examples, the WWAN module 405-a may receive a WWAN search measurement from the diversity WWAN antenna 205-b. The WWAN module 405-a may process the received WWAN search measurement with the front end portion 505 of the WWAN Rx chain. For example, the WWAN module 405-a may process the received WWAN search measurement with RF receiver components of the WWAN Rx chain. The WWAN search measurement may then be routed to the WLAN module 410-*a* via a first switch 515. The first switch 515 may be configured to route the WWAN search measurement to the WLAN module 410-*a* such that the WWAN search measurements bypass the remaining back end portion 530 of the WWAN Rx chain. In this way, the back end portion 530 of the WWAN Rx chain may have improved availability for processing other received WWAN communications.

The WLAN module 410-*a* may process the WWAN search measurement using a portion of the WLAN Rx chain 510. For example, the WWAN search measurement may be processed using an amplifier of the WLAN Rx chain 510. The WWAN search measurement may then be routed to the wireless communications/MSM controller 315-*b* via a second switch 520.

In some examples, the WLAN module 410-*a* may receive the WWAN search measurement from the WLAN antenna 210-*a*. The WLAN module 410-*a* may route the received WWAN search measurement to the front end portion 505 of the WWAN Rx chain via a third switch 525. The third switch 525 may be configured before the components of the WLAN Rx chain 510. The WWAN module 405-*a* may process the WWAN search measurement using the front end portion 505 of the WWAN Rx chain, such as RF receiver components of the WWAN Rx chain. The WWAN module 405-*a* may then route the WWAN search measurement back to the WLAN module 410-*a* via the first switch 515. The WLAN module 410-*a* may then complete the processing of the WWAN search measurement as described above.

The wireless communications/MSM controller 315-*b* may control the routing of a WWAN search measurement between the WWAN module 405-*a* and the WLAN module 410-*a* with the first, second, and third switches 515, 520, 525. The wireless communications/MSM controller 315-*a* may include a search measurement module 415-*a*. The search measurement module 415-*a* may receive the WWAN search measurement, and may use the results of the WWAN search measurement to provide the UE 115-*c* with information on the frequencies and/or RATs used by neighboring cells.

Figure 6A:
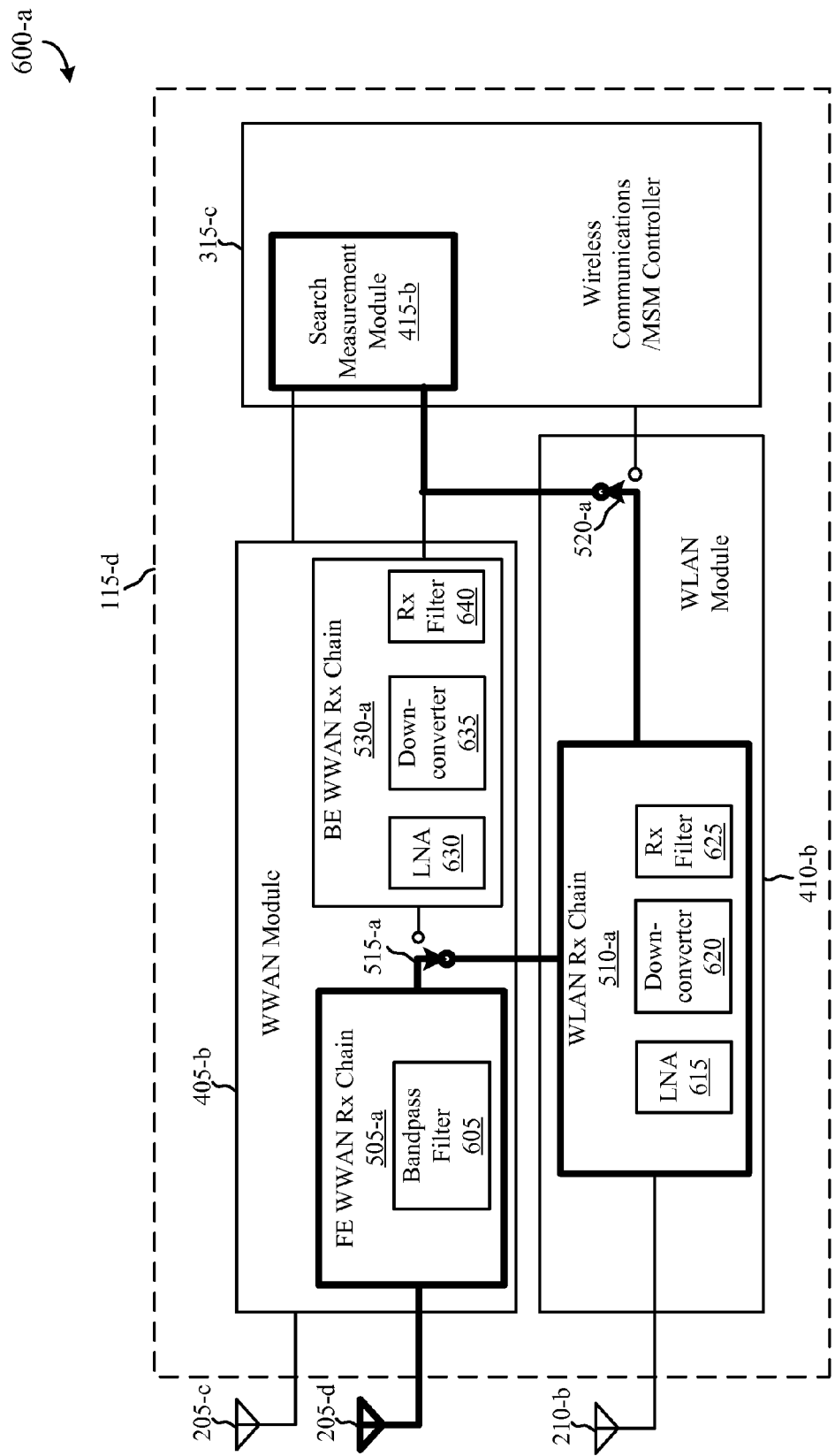
FIG. 6A shows another system for use in wireless communication, in accordance with various aspects of the present disclosure.

FIG. 6A shows a system 600-*a* for use in wireless communication, in accordance with various examples. System 600-*a* may include a UE 115-*d*, which may be an example of the UEs 115 of FIGS. 1, 2, and/or 5. UE 115-*d* may also be an example of one or more aspects of devices 305 of FIGS. 3 and/or 4.

The UE 115-*d* may include a WWAN module 405-*b*, a WLAN module 410-*b*, and a wireless communications/MSM controller 315-*c*. The WWAN module 405-*b* may be associated with a primary WWAN antenna 205-*c* and a diversity WWAN antenna 205-*d*. The WWAN module may also include a front end (FE) portion 505-*a* of a WWAN Rx chain and a back end (BE) portion 530-*a* of the WWAN Rx chain. The WLAN module may be associated with a WLAN antenna 210-*b* and may include a WLAN Rx chain 510-*a*.

The WWAN module 405-*b* may receive a WWAN search measurement from the diversity WWAN antenna 205-*d*. The WWAN module 405-*b* may process the received WWAN search measurement with the front end portion 505-*a* of the WWAN Rx chain. The front end portion 505-*a* of the WWAN Rx chain may include a bandpass filter 605 in the RF receiver of the WWAN Rx chain. The WWAN search measurement may then be routed to the WLAN module 410-*b* via a first switch 515-*a*. The first switch 515-*a* may be configured to route the WWAN search measurement to the WLAN module 410-*b* such that the WWAN search measurement bypasses the remaining back end portion 530-*a* of the WWAN Rx chain. The remaining back end portion 530-*a* of the WWAN Rx chain may include components such as a WWAN low noise amplifier (LNA) 630, a WWAN down-converter 635, and/or WWAN Rx filter 640. In this way, the components of the back end portion 530-*a* of the WWAN Rx chain may have improved availability for processing other received WWAN communications.

The WLAN module 410-*b* may process the WWAN search measurement using a portion of the WLAN Rx chain 510-*a*. The portion of the WLAN Rx chain 510-*a* may include a WLAN low noise amplifier (LNA) 615, a WLAN down-converter 620, and/or a WLAN Rx filter 625. Other components of the WLAN Rx chain 510-*a*, such as RF front end receiver components, may be bypassed. The WWAN search measurement may then be routed to the wireless communications/MSM controller 315-*c* via a second switch 520-*a*.

Figure 6B:
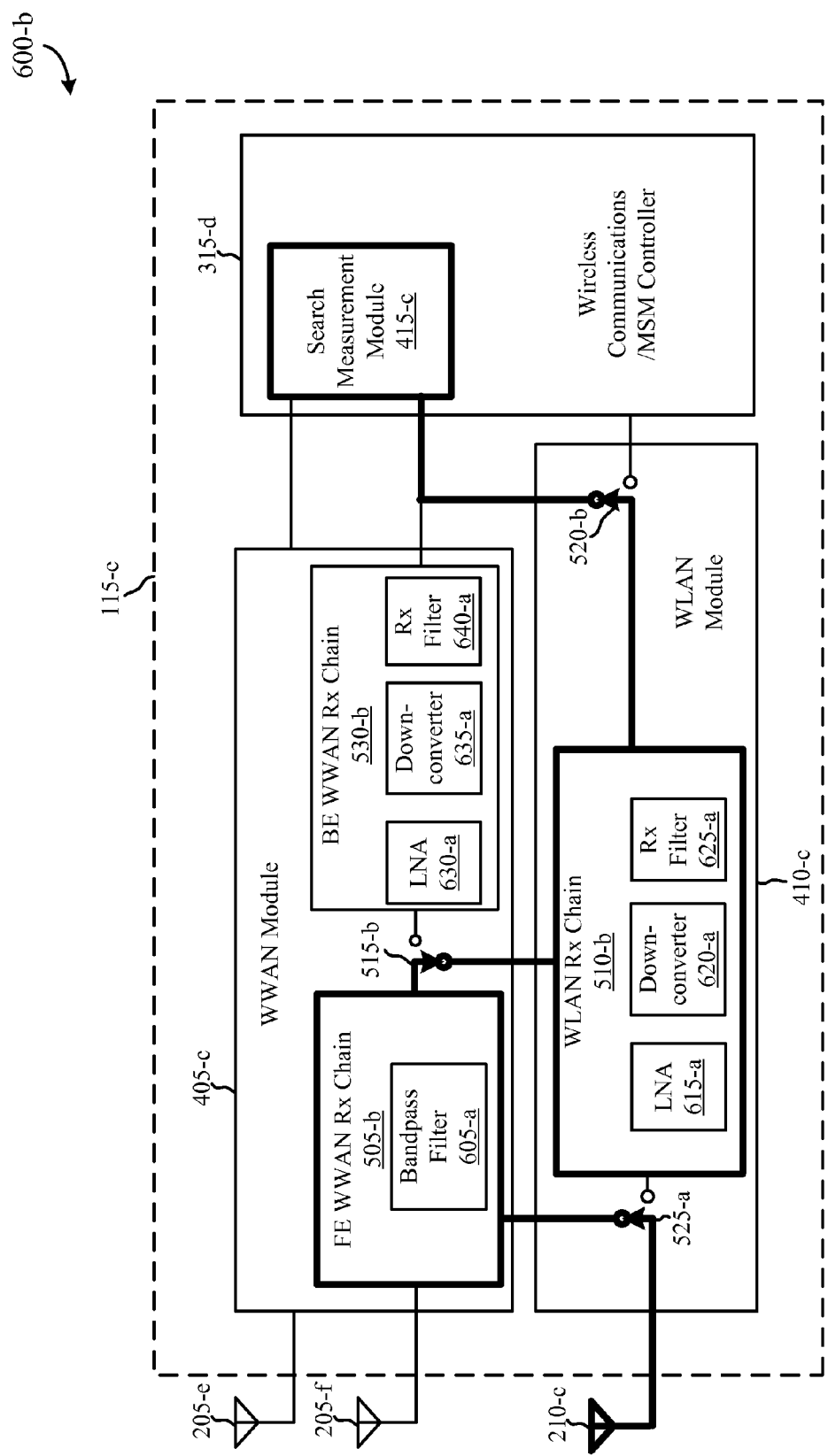
FIG. 6B shows yet another system for use in wireless communication, in accordance with various aspects of the present disclosure.

FIG. 6B shows a system 600-*b* for use in wireless communication, in accordance with various examples. System 600-*b* may include a UE 115-*e*, which may be an example of the UEs 115 of FIGS. 1, 2, and/or 5. UE 115-*e* may also be an example of one or more aspects of devices 305 of FIGS. 3 and/or 4.

The UE 115-*e* may include a WWAN module 405-*c*, a WLAN module 410-*c*, and a wireless communications/MSM controller 315-*d*. The WWAN module 405-*c* may be associated with a primary WWAN antenna 205-*e* and a diversity WWAN antenna 205-*f*. The WWAN module 405-*c* may also include a front end (FE) portion 505-*b* of a WWAN Rx chain and a back end (BE) portion 530-*b* of the WWAN Rx chain. The WLAN module 410-*c* may be associated with a WLAN antenna 210-*c* and may include a WLAN Rx chain 510-*b*.

The WLAN module 410-*c* may receive the WWAN search measurement on the WLAN antenna 210-*c*. The WLAN module 410-*c* may route the received WWAN search measurement to the front end portion 505-*b* of the WWAN Rx chain via a third switch 525-*a*. The third switch 525-*a* may be configured before the components of the WLAN Rx chain 510-*b*. The WWAN module 405-*c* may process the WWAN search measurement using the front end portion 505-*b* of the WWAN Rx chain. The front end portion 505-*b* of the WWAN Rx chain may include a bandpass filter 605-*a* in the RF receiver of the WWAN Rx chain. The WWAN module 405-*c* may then route the WWAN search measurement back to the WLAN module 410-*c* via the first switch 515-*b*. The first switch 515-*b* may be configured to route the WWAN search measurement to the WLAN module 410-*c* such that the WWAN search measurement bypasses the remaining back end portion 530-*b* of the WWAN Rx chain. The remaining back end portion 530-*b* of the WWAN Rx chain may include components such as a WWAN low noise amplifier (LNA) 630, a WWAN down-converter 635, and/or WWAN Rx filter 640. In this way, the components of the back end portion 530-*b* of the WWAN Rx chain may have improved availability for processing other received WWAN communications.

The WLAN module 410-*c* may process the WWAN search measurement using a portion of the WLAN Rx chain 510-*b*. The portion of the WLAN Rx chain 510-*b* may include a WLAN low noise amplifier (LNA) 615, a WLAN down-converter 620, and/or a WLAN Rx filter 625. Other components of the WLAN Rx chain 510-*b*, such as RF front end receiver components, may be bypassed. The WWAN search measurement may then be routed to the wireless communications/MSM controller 315-*d* via a second switch 520-*b*.

Figure 7:
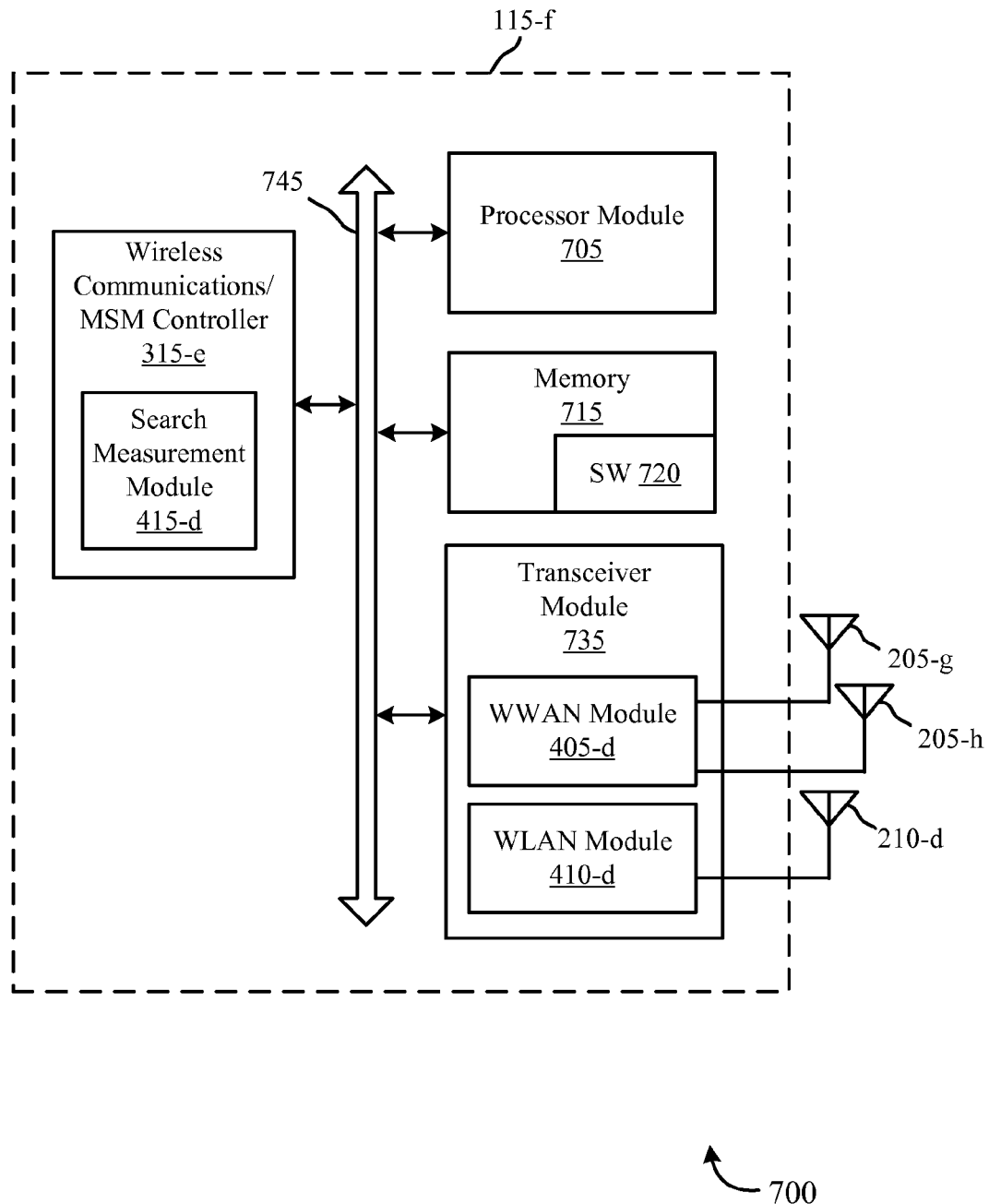
FIG. 7 shows still another system for use in wireless communication, in accordance with various aspects of the present disclosure.

FIG. 7 shows a system 700 for use in wireless communication, in accordance with various examples. System 700 may include a UE 115-f, which may be an example of the UEs 115 of FIGS. 1, 2, 5, 6A, and/or 6B. UE 115-f may also be an example of one or more aspects of devices 305 of FIGS. 3 and/or 4.

The UE 115-f may generally include components for bi-directional voice and data communications including components for transmitting communications and components for receiving communications. The UE 115-f may include primary WWAN antenna(s) 205-g, diversity WWAN antenna(s) 205-h, WLAN antenna(s) 210-d, a transceiver module 735, a processor module 705, and memory 715 (including software (SW) 720), which each may communicate, directly or indirectly, with each other (e.g., via one or more buses 745). The transceiver module 735 may be configured to communicate bi-directionally, via the primary WWAN antenna(s) 205-g, the diversity WWAN antenna(s) 205-h, the WLAN antenna(s) 210-d, and/or one or more wired or wireless links, with one or more networks, as described above. For example, the transceiver module 735 may be configured to communicate bi-directionally with base stations 105 and with the access points 110 with reference to FIGS. 1 and/or 2. The transceiver module 735 may include a WWAN module 405-d configured to modulate the packets and provide the modulated packets to the primary WWAN antenna(s) 205-g and/or diversity WWAN antenna(s) 205-h for transmission, and to demodulate packets received from the primary WWAN antenna(s) 205-g and/or diversity WWAN antenna(s) 205-h.

The UE 115-f may have multiple primary WWAN antenna(s) 205-g and multiple diversity WWAN antenna(s) 205-h capable of concurrently transmitting and/or receiving multiple wireless communications. The transceiver module 735 may be capable of concurrently communicating with one or more base stations 105 via multiple component carriers and/or communications networks. Additionally, the transceiver module 735 may include a WLAN module 410-d configured to modulate the packets and provide the modulated packets to the WLAN antenna(s) 210-d for transmission, and to demodulate packets received from the WLAN antenna(s) 210-d. The UE 115-f may have multiple WLAN antenna(s) 210-d capable of concurrently transmitting and/or receiving multiple wireless communications. The transceiver module 735 may be capable of communicating with one or more access points 110 via the WLAN antenna(s) 210-d. The transceiver module 735 may use a portion of the components in the WLAN module 410-d to process WWAN search measurements. In some examples, the WWAN search measurements may be received on one of the WWAN antenna(s) 205-g. In other examples, the WWAN search measurements may be received on the WLAN antenna(s) 210-d.

The UE 115-e may include a wireless communications/MSM controller 315-e, which may perform the functions described above for the wireless communications/MSM controller 315 of device 305 of FIGS. 3 and 4 and/or of UE 115 of FIGS. 5, 6A, and 6B. The wireless communications/MSM controller 315-e may control the routing of the search measurements between the WWAN module 405-g and the WLAN module 410-d. In some examples, the wireless communications/MSM controller 315-e may also control the sharing of the WLAN antenna(s) 210-d for WLAN communications and WWAN search measurements. The wireless communications/MSM controller 315-e may include a search measurement module 415-d. The search measurement module 415-d may instruct the wireless communications/MSM controller 315-e to search for additional WWAN cells or RATs. The search measurement module 415-d may also use the results of the search measurements to provide the UE 115-f with information on the frequencies and/or RATs used by neighboring cells.

The memory 715 may include random access memory (RAM) and read-only memory (ROM). The memory 715 may store computer-readable, computer-executable software/firmware code 720 containing instructions that are configured to, when executed, cause the processor module 705 to perform various functions described herein (e.g., route WWAN search measurements to a portion of a WLAN Rx chain for processing, etc.). Alternatively, the computer-readable, computer-executable software/firmware code 720 may not be directly executable by the processor module 705 but be configured to cause a computer (e.g., when compiled and executed) to perform functions described herein. The processor module 705 may include an intelligent hardware device, e.g., a central processing unit (CPU), a microcontroller, an application-specific integrated circuit (ASIC), etc.

Figure 8:
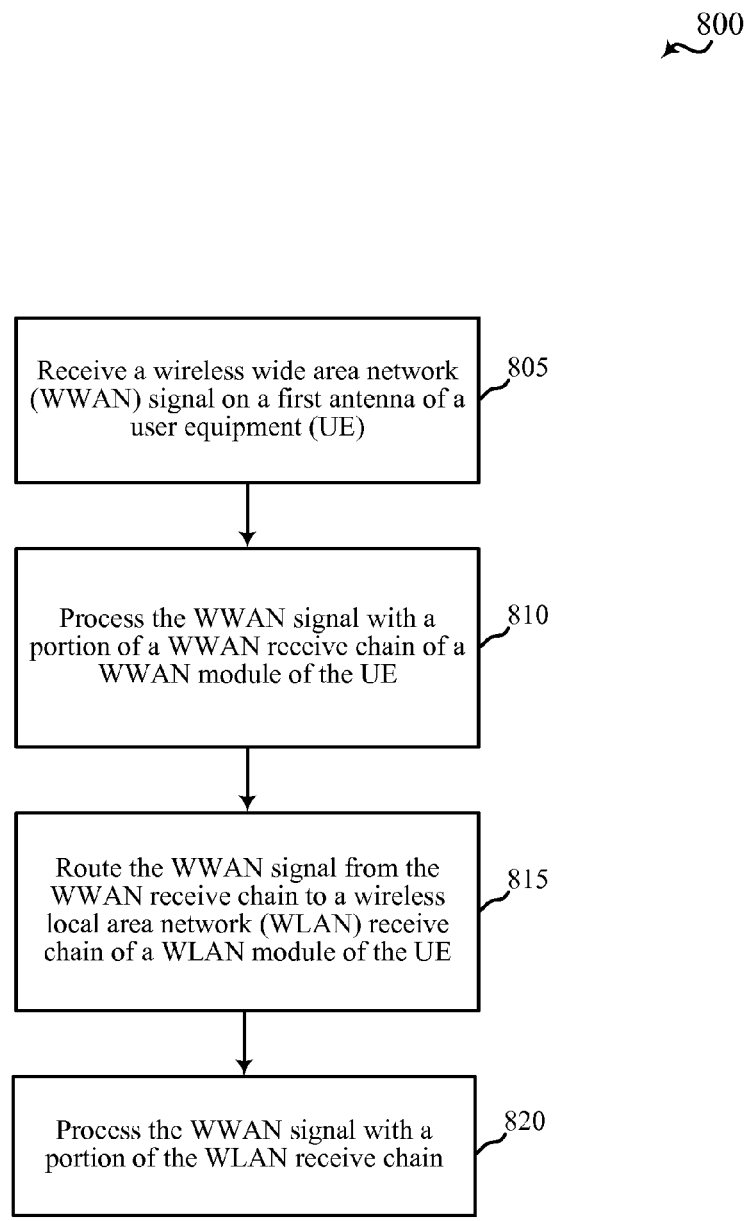
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the UEs 115 described with reference to FIGS. 1, 2, 5, 6A, 6B and/or 7, and/or aspects of one or more of the devices 305 described with reference to FIGS. 3 and/or 4. In some examples, a UE may execute one or more sets of codes to control the functional elements of the UE to perform the functions described below. Additionally or alternatively, the UE may perform one or more of the functions described below using special-purpose hardware.

At block 805, the method 800 may include receiving a wireless wide area network (WWAN) signal on a first antenna of a user equipment (UE). In some examples, the first antenna may be a diversity WWAN antenna associated with a WWAN module of the UE. In other examples, the first antenna may be a WLAN antenna associated with a WLAN module of the UE. The WWAN signal may include a WWAN search measurement. The operations at block 805 may be performed using the WWAN module 405 or the WLAN module 410 described with reference to FIGS. 4, 5, 6A, 6B, and 7.

At block 810, the method 800 may include processing the WWAN signal with a portion of a WWAN receive chain of a WWAN module of the UE. The portion of the WWAN receive chain may include a bandpass filter in the RF front end of the WWAN receive chain. The operations at block 810 may be performed using the WWAN module 405 described with reference to FIGS. 4, 5, 6A, 6B, and 7.

At block 815, the method 800 may include routing the WWAN signal from the WWAN receive chain to a wireless local area network (WLAN) receive chain of a WLAN module of the UE. The WWAN signal may be routed after the bandpass filter in the RF front end of the WWAN receive chain and may bypass the other components of the WWAN receive chain. The WWAN signal may be routed using a switch in the WWAN receive chain. The operations at block 815 may be performed using the WWAN module 405 described with reference to FIGS. 4, 5, 6A, 6B, and 7.

At block 820, the method 800 may include processing the WWAN signal with a portion of the WLAN receive chain. The portion of the WWAN receive chain may include an amplifier of the WLAN module. The operations at block 820 may be performed using the WLAN module 410 described with reference to FIGS. 4, 5, 6A, 6B, and 7. Digital baseband processing may then be performed on the WWAN signal by a baseband controller, such as an MSM.

Thus, the method 800 may provide for wireless communication. It should be noted that the method 800 is just one implementation and that the operations of the method 800 may be rearranged or otherwise modified such that other implementations are possible.

Figure 9:
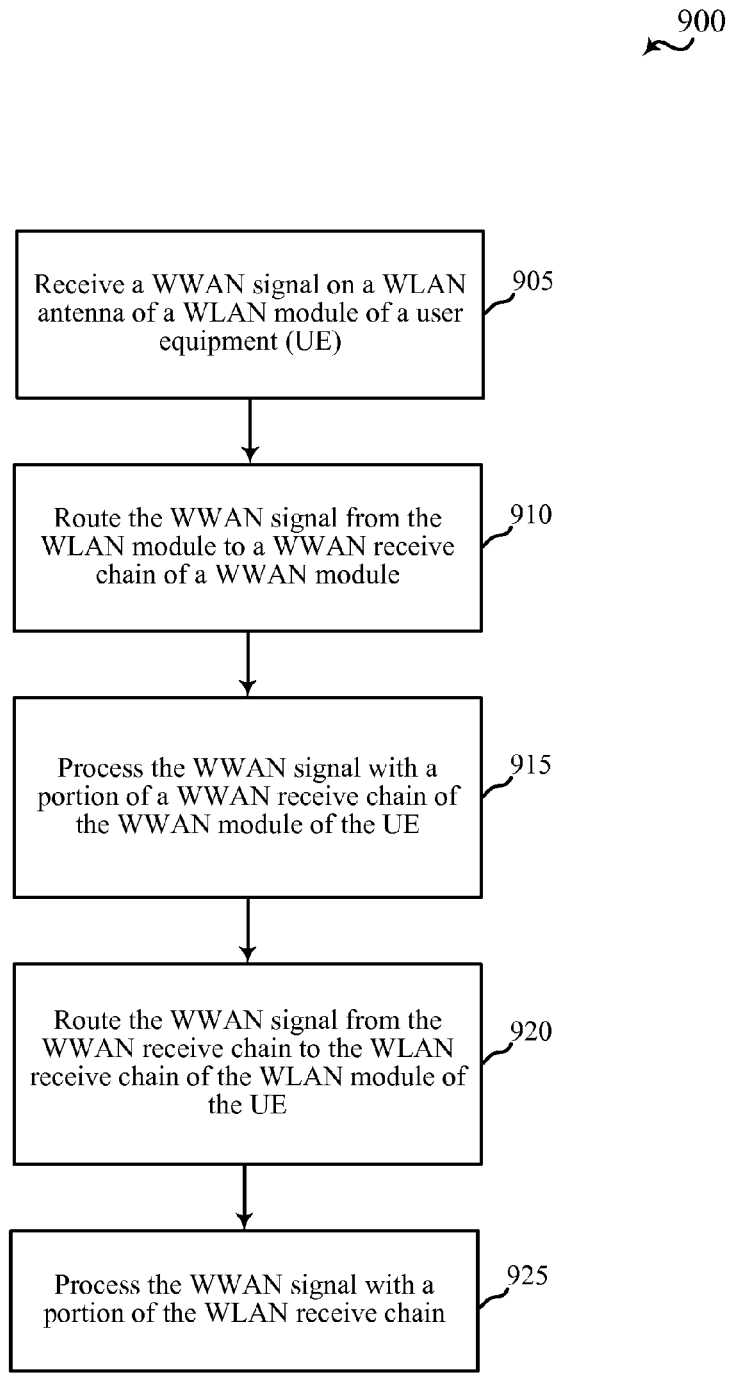
FIG. 9 is a flow chart illustrating another example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the UEs 115 described with reference to FIGS. 1, 2, 5, 6A, 6B and/or 7, and/or aspects of one or more of the devices 305 described with reference to FIGS. 3 and/or 4. In some examples, a UE may execute one or more sets of codes to control the functional elements of the UE to perform the functions described below. Additionally or alternatively, the UE may perform one or more of the functions described below using special-purpose hardware.

At block 905, the method 900 may include receiving a receiving a WWAN signal on a WLAN antenna associated with a WLAN module of a user equipment (UE). The WWAN signal may include a WWAN search measurement. The operations at block 905 may be performed using the WLAN module 410 described with reference to FIGS. 4, 5, 6A, 6B, and 7.

At block 910, the method 900 may include routing the WWAN signal from the WLAN module to a WWAN receive chain of a WWAN module. The WWAN signal may be routed before the RF front end components of the WLAN module using a switch in the WLAN receive chain. The operations at block 910 may be performed using the WLAN module 410 described with reference to FIGS. 4, 5, 6A, 6B, and 7.

At block 915, the method 900 may include processing the WWAN signal with a portion of a WWAN receive chain of the WWAN module of the UE. The portion of the WWAN receive chain may include a bandpass filter in the RF front end of the WWAN module. The operations at block 915 may be performed using the WWAN module 405 described with reference to FIGS. 4, 5, 6A, 6B, and 7.

At block 920, the method 900 may include routing the WWAN signal from the WWAN receive chain to the WLAN receive chain of a WLAN module of the UE. The WWAN signal may be routed after the bandpass filter in the RF front end of the WWAN receive chain and may bypass the other components of the WWAN receive chain. The WWAN signal may be routed using a switch in the WWAN receive chain. The operations at block 920 may be performed using the WWAN module 405 described with reference to FIGS. 4, 5, 6A, 6B, and 7.

At block 925, the method 900 may include processing the WWAN signal with a portion of the WLAN receive chain. The portion of the WWAN receive chain may include an amplifier of the WLAN module. The operations at block 925 may be performed using the WLAN module 410 described with reference to FIGS. 4, 5, 6A, 6B, and 7. Digital baseband processing may then be performed on the WWAN signal by a baseband controller, such as an MSM.

Thus, the method 900 may provide for wireless communication. It should be noted that the method 900 is just one implementation and that the operations of the method 900 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving a wireless wide area network (WWAN) signal on a wireless local area network (WLAN) antenna associated with a WLAN module of a user equipment (UE), the WLAN module comprising a WLAN receive chain;
   routing the WWAN signal from the WLAN module to a WWAN receive chain of a WWAN module, the WWAN receive chain comprising a front-end portion and a back-end portion, wherein the WWAN module is distinct from the WLAN module:
   processing the WWAN signal with the front-end portion of the WWAN receive chain of the WWAN module of the UE;
   routing the WWAN signal from the WWAN receive chain to the WLAN receive chain of the WLAN module of the UE using a switch positioned between the front-end portion of the WWAN receive chain and the back-end portion of the WWAN receive chain, wherein the back-end portion comprises a WWAN low noise amplifier, a WWAN down-converter, and a WWAN receive filter and wherein the WWAN module comprises the switch: and
   processing the WWAN signal with a portion of the WLAN receive chain.

2. The method of claim 1, wherein routing the WWAN signal from the WLAN module to the WWAN receive chain comprises:
   routing the WWAN signal from the WLAN module to the WWAN receive chain using a second switch positioned between the WLAN antenna and the WLAN receive chain.

3. The method of claim 1, wherein the front-end portion of the WWAN receive chain comprises a bandpass filter of the WWAN module.

4. The method of claim 3, wherein routing the WWAN signal from the WWAN receive chain to the WLAN receive chain comprises:
   routing the WWAN signal after the bandpass filter of the WWAN module.

5. The method of claim 1, wherein the portion of the WLAN receive chain comprises an amplifier of the WLAN module.

6. The method of claim 1, wherein the WWAN signal comprises a WWAN search measurement.

7. The method of claim 1, further comprising:
   receiving a second WWAN signal on a second antenna of the UE, the second WWAN signal comprising an active downlink signal.

8. An apparatus for wireless communication, comprising:
   means for receiving a wireless wide area network (WWAN) signal on a wireless local area network (WLAN) antenna associated with a WLAN module of a user equipment (UE), the WLAN module comprising a WLAN receive chain;
   means for routing the WWAN signal from the WLAN module to a WWAN receive chain of a WWAN module, the WWAN receive chain comprising a front-end portion and a back-end portion, wherein the WWAN module is distinct from the WLAN module:
   means for processing the WWAN signal with the front-end portion of the WWAN receive chain of the WWAN module of the UE;
   means for routing the WWAN signal from the WWAN receive chain to the WLAN receive chain of a WLAN module of the UE using a switch positioned between the front-end portion and the back-end portion of the WWAN receive chain, wherein the back-end portion comprises a WWAN low noise amplifier, a WWAN down-converter and a WWAN receive filter, and wherein the WWAN module comprises the switch: and
means for processing the WWAN signal with a portion of the WLAN receive chain.

9. The apparatus of claim 8, wherein the routing the WWAN signal from the WLAN module to the WWAN receive chain comprises:
routing the WWAN signal from the WLAN module to the WWAN receive chain using a second switch positioned between the WLAN antenna and the WLAN receive chain.

10. The apparatus of claim 8, wherein the front-end portion of the WWAN receive chain comprises a bandpass filter of the WWAN module.

11. The apparatus of claim 10, wherein the means for routing the WWAN signal from the WWAN receive chain to the WLAN receive chain comprises:
means for routing the WWAN signal after the bandpass filter of the WWAN module.

12. The apparatus of claim 8, wherein the portion of the WLAN receive chain comprises an amplifier of the WLAN module.

13. The apparatus of claim 8, wherein the WWAN signal comprises a WWAN search measurement.

14. The apparatus of claim 8, further comprising:
means for receiving a second WWAN signal on a second antenna of the UE, the second WWAN signal comprising an active downlink signal.

15. An apparatus for wireless communication, comprising:
a processor;
memory in electronic communication with the processor; and instructions stored in the memory, the instructions being executable by the processor to:
route the WWAN signal from the WLAN module to a WWAN receive chain of a WWAN module, the WWAN receive chain comprising a front-end portion and a back-end portion, wherein the WWAN module is distinct from the WLAN module:
process the WWAN signal with the front-end of the WWAN receive chain of the WWAN module of the UE;
route the WWAN signal from the WWAN receive chain to the WLAN receive chain of the WLAN module of the UE using a switch positioned between the front-end portion and the back-end portion of the WWAN receive chain, wherein the back-end portion comprises a WWAN low noise amplifier, a WWAN down-converter and a WWAN receive filter, and wherein the WWAN module comprises the switch; and
process the WWAN signal with a portion of the WLAN receive chain.

16. The apparatus of claim 15, wherein the instructions for routing the WWAN signal from the WLAN module to the WWAN receive chain include instructions executable by the processor to:
route the WWAN signal from the WLAN module to the WWAN receive chain using a second switch positioned between the WLAN antenna and the WLAN receive chain.

17. The apparatus of claim 15, wherein the front-end portion of the WWAN receive chain comprises a bandpass filter of the WWAN module.

18. A non-transitory computer-readable medium storing computer-executable code for wireless communication, the code executable by a processor to:
receive a wireless wide area network (WWAN) signal on a wireless local area network (WLAN) antenna associated with a WLAN module of a user equipment (UE), the WLAN module comprising a WLAN receive chain;
route the WWAN signal from the WLAN module to a WWAN receive chain of a WWAN module, the WWAN receive chain comprising a front-end portion and a back-end portion, wherein the WWAN module is distinct from the WLAN module:
process the WWAN signal with the front-end portion of the WWAN receive chain of the WWAN module of the UE;
route the WWAN signal from the WWAN receive chain to the WLAN receive chain of the WLAN module of the UE using a switch positioned between the front-end portion and the back-end portion of the WWAN receive chain, wherein the back-end portion comprises a WWAN low noise amplifier, a WWAN down-converter and a WWAN receive filter, and wherein the WWAN module comprises the switch; and
process the WWAN signal with a portion of the WLAN receive chain.

\* \* \* \* \*